United States Patent
Schager et al.

(10) Patent No.: US 11,900,545 B2
(45) Date of Patent: Feb. 13, 2024

(54) CREATING EFFECTS BASED ON FACIAL FEATURES

(71) Applicant: Lemon Inc., Grand Cayman (KY)

(72) Inventors: Nathanael Schager, Los Angeles, CA (US); Zhe Huang, Los Angeles, CA (US); Kewei Chen, Beijing (CN); Nite Luo, Los Angeles, CA (US); Clement Boissiere, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/570,304

(22) Filed: Jan. 6, 2022

(65) Prior Publication Data

US 2023/0215099 A1  Jul. 6, 2023

(51) Int. Cl.
| | | |
|---|---|---|
| G06T 19/00 | (2011.01) | |
| G06T 7/11 | (2017.01) | |
| G06T 15/04 | (2011.01) | |
| G06T 17/20 | (2006.01) | |

(52) U.S. Cl.
CPC ............... G06T 19/00 (2013.01); G06T 7/11 (2017.01); G06T 15/04 (2013.01); G06T 17/20 (2013.01); G06T 2207/10016 (2013.01)

(58) Field of Classification Search
CPC . G06T 19/00; G06T 7/11; G06T 15/04; G06T 17/20; G06T 2207/10016; G06T 11/001; G06T 7/251; G06T 11/00; G06T 2207/30201; G06T 2207/20221; G06T 2207/20081; G06K 9/00281; G06K 9/621; G06V 40/171; G06V 10/7557
See application file for complete search history.

(56) References Cited

U.S. PATENT DOCUMENTS

| | | | |
|---|---|---|---|
| 7,110,000 B2 * | 9/2006 | Zhang ................... | G06T 11/001 345/592 |
| 10,491,887 B2 * | 11/2019 | Haimovitch-Yogev ..................... | H04N 13/161 |
| 10,529,078 B2 * | 1/2020 | Abreu ..................... | G06T 7/251 |
| 10,666,853 B2 * | 5/2020 | Tomita ................ | G06F 3/04845 |
| 2010/0202699 A1 * | 8/2010 | Matsuzaka ............ | G06T 11/001 382/307 |
| 2017/0026565 A1 * | 1/2017 | Hong ................... | G06V 40/161 |

(Continued)

FOREIGN PATENT DOCUMENTS

| | | |
|---|---|---|
| CN | 111882627 A | 11/2020 |
| CN | 113470182 A | 10/2021 |
| WO | WO 2021/226862 A1 | 11/2021 |

OTHER PUBLICATIONS

International Patent Application No. PCT/SG2022/050941; Int'l Search Report; dated Aug. 31, 2023; 5 pages.

(Continued)

*Primary Examiner* — Abderrahim Merouan
(74) *Attorney, Agent, or Firm* — BakerHostetler

(57) ABSTRACT

The present disclosure describes techniques for creating effects based on facial features. A mesh comprising a set of vertices based on detecting key points of at least one facial part may be created. A mask may be created based on rendering the mesh. A filter may be created by applying a function to a texture based on the mask. A portion of at least one image may be extracted based at least in part on the mask. The portion may correspond to the at least one facial part. An effect may be created on the extracted portion using the filter.

17 Claims, 8 Drawing Sheets

(56) References Cited

U.S. PATENT DOCUMENTS

| | | | | |
|---|---|---|---|---|
| 2017/0076474 A1* | 3/2017 | Fu | .................. | G06T 11/00 |
| 2018/0206618 A1* | 7/2018 | Nishi | .................. | G06T 11/60 |
| 2019/0026907 A1* | 1/2019 | Abreu | .................. | G06T 7/75 |
| 2019/0122404 A1* | 4/2019 | Freeman | .................. | G06V 10/56 |
| 2020/0020149 A1* | 1/2020 | Moltaji | .................. | G06T 11/001 |
| 2021/0067756 A1 | 3/2021 | Goodrich et al. | | |

OTHER PUBLICATIONS

J. J. Garcia; "Practical Real-Time Strategies for Photorealistic Skin Rendering and Antialiasing"; Universidad Zaragoza; Thesis Doctoral; 2012; 162 pages.

* cited by examiner

CREATING EFFECTS BASED ON FACIAL FEATURES

BACKGROUND

Communication is increasingly being conducted using Internet-based tools. The Internet-based tools may be any software or platform. Users may create content to be shared via such Internet-based tools. Improved techniques for content creation via such Internet-based tools are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Communication can be conducted using Internet-based tools that allow users to create content and distribute such content to other users for consumption. Such Internet-based tools may provide users with various effects to use when creating content. One or more of the effects can be created based on facial features. For example, a user (e.g., content creator) can create an effect that allows a user to map a feature of the user's body or face (e.g., eyes, mouth, nose) to a background image. The background image may be an image of the user, or an image that depicts something or somebody other than the user.

Creating effects based on facial features can be complicated. For example, existing techniques for creating such effects rely on the creation of a mesh that includes vertices. The positions of the vertices are set for each frame based on a face key point algorithm. The mesh may need "feathering." Feathering is a technique used in computer graphics software to smooth or blur the edges of a feature. The mesh may need feathering to help the extracted facial features blend into the background image better, or in a less noticeable manner. If the mesh needs feathering on the outside of the mesh, additional geometry is constructed and the alpha is interpolated between the inner and outer shell of the mesh. For example, to construct the additional geometry, the base mesh may be subdivided.

However, such existing techniques for creating effects based on facial features have undesirable effects. For example, the constructed mesh is prone to jitters. The instability of the mesh subdivision method renders lower subdivision levels unusable. As another example, the feathering gets line-like artifacts from the geometry. A high subdivision level is needed to hide these artifacts, and even at a high sub-division level some jittering and line artifacts remain.

The techniques for creating effects based on facial features described in the present disclosure remedy undesirable effects of existing techniques. For example, the techniques described herein for face inset rendering use a multi-pass shader. The multi-pass shader helps to lessen the effect of any jittering from the face key point algorithm and frees the result from the need for subdivision algorithms. Additionally, the techniques described herein do not result in line-like artifacts in the feathered area, even when using lower resolution rendering settings.

Figure 1:
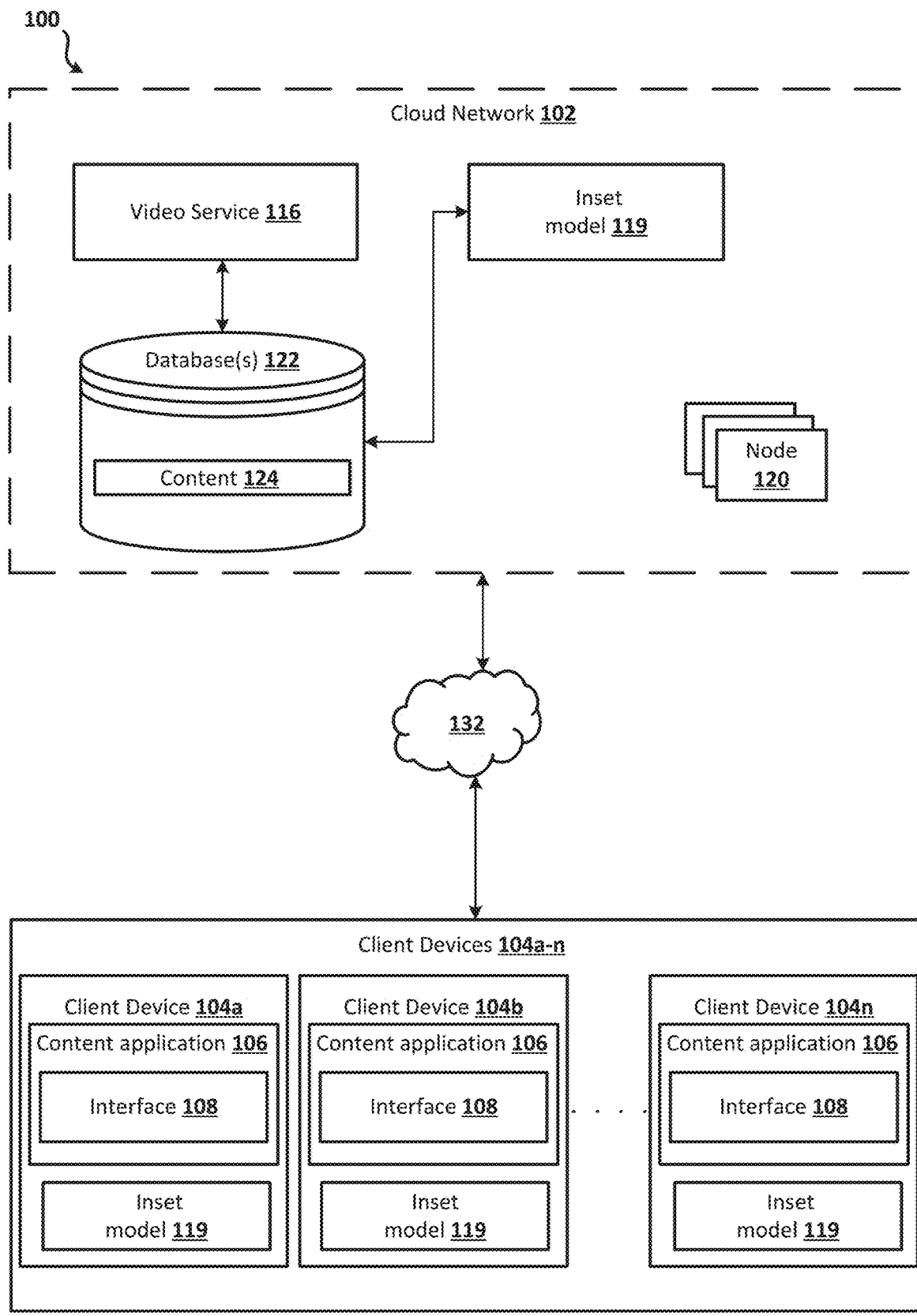
FIG. 1 shows an example system that may be used in accordance with the present disclosure.

FIG. 1 illustrates an example system 100 for creating effects based on facial features. The system 100 may comprise a cloud network 102 and a plurality of client devices 104a-n. The cloud network 102 and the plurality of client devices 104a-n may communicate with each other via one or more networks 132.

The cloud network 102 may be located at a data center, such as a single premise, or be distributed throughout different geographic locations (e.g., at several premises). The cloud network 102 may provide the services via the one or more networks 132. The network 132 comprise a variety of network devices, such as routers, switches, multiplexers, hubs, modems, bridges, repeaters, firewalls, proxy devices, and/or the like. The network 132 may comprise physical links, such as coaxial cable links, twisted pair cable links, fiber optic links, a combination thereof, and/or the like. The network 132 may comprise wireless links, such as cellular links, satellite links, Wi-Fi links and/or the like.

The cloud network 102 may comprise a plurality of computing nodes 120 that host a variety of services. In an embodiment, the nodes 120 host a video service 116. The video service 116 may comprise a content streaming service, such as an Internet protocol video streaming service. The video service 116 may be configured to distribute content 124 via a variety of transmission techniques. The video service 116 is configured to provide the content 124, such as video, audio, textual data, a combination thereof, and/or the like. The content 124 may comprise content streams (e.g., video stream, audio stream, information stream), content files (e.g., video file, audio file, text file), and/or other data. The content 124 may be stored in a database 122. For example, the video service 116 may comprise a video sharing service, a video hosting platform, a content distribution platform, a collaborative gaming platform, and/or the like.

In an embodiment, the content 124 distributed or provided by the video service 116 comprises short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

The short videos may comprise a pre-recorded audio overlay, such as a clip of a pre-recorded song or audio from a television show or movie. If a short video comprises a pre-recorded audio overlay, the short video may feature one or more individuals lip-syncing, dancing, or otherwise moving their body along with the pre-recorded audio. For example, a short video may feature an individual completing a "dance challenge" to a popular song or a short video may feature two individuals participating in a lip-syncing or dancing duet. As another example, a short video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other short videos may not comprise a pre-recorded audio overlay. For example, these short videos may feature an individual playing sports, performing practical jokes, or giving advice, such as beauty and fashion advice, cooking tips, or home renovation tips.

In an embodiment, the content 124 may be output to different client devices 104a-n via the network 132. The content 124 may be streamed to the client devices 104a-n. The content stream may be a stream of short videos received from the video service 116. The plurality of client devices 104a-n may be configured to access the content 124 from the video service 116. In an embodiment, a client device 104a-n may comprise a content application 106. The content application 106 outputs (e.g., display, render, present) the content 124 to a user associated with the client device 104a-n. The content may comprise videos, audio, comments, textual data and/or the like.

The plurality of client devices 104a-n may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104a-n may be associated with one or more users. A single user may use one or more of the plurality of client devices 104a-n to access the cloud network 102. The plurality of client devices 104a-n may travel to a variety of locations and use different networks to access the cloud network 102.

The video service 116 may be configured to receive input from users. The users may be registered as users of the video service 116 and may be users of the content application 106 operating on client devices 104a-n. The user inputs may include short videos created by users, user comments associated with short videos, or "likes" associated with short videos. The user inputs may include connection requests and user input data, such as text data, digital image data, or user content. The connection requests may comprise requests from the client devices 104a-n to connect to the video service 116. The user input data may include information, such as short videos and/or user comments, that the users connected to the video service 116 want to share with other connected users of the video service 116.

The video service 116 may be able to receive different types of input from users using different types of client devices 104a-n. For example, a user using the content application 106 on a first user device, such as a mobile phone or tablet, may be able to create and upload short videos using the content application 106. A user using the content application 106 on a different mobile phone or tablet may also be able to view, comment on, or "like" short videos or comments written by other users. In another example, a user using the content application 106 on a smart television, laptop, desktop, or gaming device may not be able to create and upload short videos or comment on short videos using the content application 106. Instead, the user using the content application 106 on a smart television, laptop, desktop, or gaming device may only be able to use the content application 106 to view short videos, view comments left by other users, and "like" short videos.

In an embodiment, a user may use the content application 106 on a client device 104a-n to create a short video and upload the short video to the cloud network 102. The client devices 104a-n may access an interface 108 of the content application 106. The interface 108 may comprise an input element. For example, the input element may be configured to allow users to create the short video. To create the short video, the user may give the content application 106 permission to access an image capture device, such as a camera, or a microphone of the client device 104a-n. Using the content application 106, the user may select a duration for the short video or set a speed for the short video, such as "slow-motion" or "speed things up."

The user may edit the short video using the content application 106. The user may add one or more texts, filters, sounds, or effects, such as AR effects, to the short video. To add a pre-recorded audio overlay to the short video, the user may select a song or sound clip from a sound library of the content application 106. The sound library may include different songs, sound effects, or audio clips from movies, albums, and television shows. In addition to or in lieu of adding a pre-recorded audio overlay to the short video, the user may use the content application 106 to add a voice-over to the short video. The voice-over may be a sound recorded by the user using a microphone of the client device 104a-n. The user can add a text overlay to the short video and may use the content application 106 to specify when they want the text overlay to appear in the short video. The user may assign a caption, location tag, and one or more hashtags to the short video to indicate the subject matter of the short video. The content application 106 may prompt the user to select a frame of the short video to use as a "cover image" for the short video.

After the user has created the short video, the user may use the content application 106 to upload the short video to the cloud network 102 and/or to save the short video locally to the user device 104a-n. When a user uploads the short video to the cloud network 102, they may choose whether they want the short video to be viewable by all other users of the content application 106 or viewable by only a subset of the users of the content application 106. The video service 116 may store the uploaded short videos and any metadata associated with the short videos as content 124 in one or more databases 122.

In an embodiment, a user may use the content application 106 on a client device 104a-n to provide input on a short video. The client devices 104a-n may access an interface 108 of the content application 106 that allows users to provide input associated with short videos. The interface 108 may comprise an input element. For example, the input element may be configured to receive input from a user, such as comments or "likes" associated with a particular short video. If the input is a comment, the content application 106 may allow a user to set an emoji associated with his or her input. The content application 106 may determine timing information for the input, such as when a user wrote a comment. The content application 106 may send the input and associated metadata to the cloud network 102. For example, the content application 106 may send a comment, an identifier of the user that wrote the comment, and the timing information for the comment to the cloud network 102. The video service 116 may store the input and associated metadata in a database 122.

The video service 116 may be configured to output the uploaded short videos and user input to other users. The users may be registered as users of the video service 116 to view short videos created by other users. The users may be users of the content application 106 operating on client devices 104*a*-*n*. The content application 106 may output (display, render, present) the short videos and user comments to a user associated with a client device 104*a*-*n*. The client devices 104*a*-*n* may access an interface 108 of the content application 106. The interface 108 may comprise an output element. The output element may be configured to display information about different short videos so that a user can select a short video to view. For example, the output element may be configured to display a plurality of cover images, captions, or hashtags associated with the short videos. The output element may also be configured to arrange the short videos according to a category associated with each short video.

In an embodiment, the user comments associated with a short video may be output to other users watching the same short video. For example, all users accessing a short video may view comments associated with the short video. The video service 116 may output the short video and the associated comments simultaneously. Comments may be output by the video service 116 in real-time or near-real-time. The content application 106 may display the short videos and comments in various ways on the client device 104*a*-*n*. For example, the comments may be displayed in an overlay above the content or in an overlay beside the content. As another example, a user that wants to view other users' comments associated with a short video may need to select a button in order to view the comments. The comments may be animated when displayed. For example, the comments may be shown scrolling across the short video or across the overlay.

The plurality of computing nodes 120 may process tasks associated with the video service 116. The plurality of computing nodes 120 may be implemented as one or more computing devices, one or more processors, one or more virtual computing instances, a combination thereof, and/or the like. The plurality of computing nodes 120 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the cloud network 102 and/or the client devices 104*a*-*n* comprise an inset model 119. The inset model 119 facilitates the creation of effects based on facial features. For example, a user associated with a client device 104*a*-*n* may utilize the inset model 119 to perform face inset rendering. As described above, an effect created based on facial features may allow a user to map a feature of the user's body or face (e.g., eyes, mouth, nose) to a background image. The background image may be an image of the user, or an image that depicts something or somebody other than the user. To perform face inset rendering, the inset model 119 is configured to utilize a multi-pass shader. The multi-pass shader may help to lessen the effect of any jittering from the face key point algorithm and/or frees the result from the need for subdivision algorithms. Additionally, unlike existing face inset rendering techniques, the inset model 119 does not result in line-like artifacts in feathered areas, even when using lower resolution rendering settings.

In embodiments, to perform face inset rendering, the inset model 119 is configured to generate a mesh (e.g., base mesh). The mesh includes a set of vertices based on detecting key points of at least one facial feature or body part (such as the facial feature or body part that is going to be mapped to a background image). For example, if the user wants to create an effect that maps the users mouth to a background image, the mesh includes a set of vertices based on detecting key points of the user's mouth.

The inset model 119 may generate or build the mesh through script. Each vertex may have an index that corresponds to the index of a face algorithm key point. In some embodiments, the key points have to "wrap" in either a clockwise or counterclockwise fashion. However, the inset model 119 may not need to set the positions of the vertices yet, as long as the mesh is constructed correctly. For example, if the face algorithm output associated with a mouth has 9 key points, the mesh constructed by the inset model 119 may have 9 vertices.

In embodiments, the inset model 119 may calculate the extents of the key points from the face key point algorithm. For example, the inset model 119 may calculate one or more of the center, the left and/or right extents, and the top and/or down extents of the key points from the face key point algorithm. The inset model 119 may calculate the extents after generating the mesh.

In embodiments, the inset model 119 may set the material properties. Such material properties may be utilized for use in passes one and four of the multi-pass shader that is discussed below in more detail. Optionally, the multi-pass shader includes passes two and three. Passes two and three may be included if blurring is enabled. If blurring is enabled, the inset model 119 may calculate the blur parameters and set the material properties for use in passes two and three.

In embodiments, the inset model 119 inputs the mesh into a multi-pass shader or sends the mesh to a multi-pass shader. The multi-pass shader may be a component of the inset model 119. First, the mesh may be input into the first pass of the multi-pass shader. The first pass of the multi-pass shader may comprise a vertex shader. The vertex shader may transform the attributes of the vertices, such as shape positions, into three-dimensional drawing coordinates. The vertex shader may set the positions of the vertices in clip space to correspond to the screen space positions from the face algorithm key point positions. The vertex shader may additionally modify the vertex positions to account for the center, zoom, and/or rotation of the face inset object. For example, the vertex positions maybe modified using the left/right and up/down extents as well as the center.

The first pass of the multi-pass shader may comprise a fragment shader. A fragment shader (e.g., a pixel shader) computes color and other attributes of each "fragment" (e.g., a unit of rendering work affecting at most a single output pixel). Some fragment shaders may output one screen pixel as a color value, while multiple inputs/outputs are also possible. The fragment shader can alter the depth of the fragment, or output more than one color if multiple render targets are active.

The fragment shader may be configured to create an alpha mask based on the rendered mesh. The fragment shader may create an alpha mask by rendering the mesh in white with a black background. For example, if the user wants to create an effect that maps the user's mouth to a background image, the mesh includes a set of vertices based on detecting key points of the user's mouth. Creating the alpha mask may comprise rendering the area indicated by or surrounded by the set of vertices in white, with a black background surrounding the white area.

In embodiments, the second and/or third passes of the multi-pass shader are optional, such as if blur is enabled. The second and/or third passes of the multi-pass shader may be utilized to create a filter. For example, the second pass may include a vertex shader that utilizes a screen space quad. The second pass may additionally or alternatively include a fragment shader. The fragment shader may apply a horizontal Gaussian blur on the alpha texture result from the first pass. The third pass may also include a vertex shader using a screen space quad. The third pass may additionally or alternatively include a fragment shader. The fragment shader may apply a vertical Gaussian blur on the alpha texture result from the first or second pass.

A Gaussian blur (also known as Gaussian smoothing) is the result of blurring an image by a Gaussian function. In a Gaussian blur, the pixels nearest the center of the kernel are given more weight than those far away from the center. This averaging is done on a channel-by-channel basis, and the average channel values become the new value for the filtered pixel. The Gaussian blur can be applied to a two-dimensional image as two independent one-dimensional calculations, and so is termed a separable filter. That is, the effect of applying the two-dimensional matrix can also be achieved by applying a series of single-dimensional Gaussian matrices in the horizontal direction (such as in the second pass), then repeating the process in the vertical direction (such as in the third pass).

The fourth pass of the multi-pass shader may comprise a vertex shader that uses a world space quad (e.g., a quad with position multiplied by camera MVP matrix). The fourth pass may modify the UV (e.g., texture) coordinates to account for the center, zoom, and rotation of the face inset object. For example, the fourth pass may modify the UV coordinates using the left/right and up/down extents as well as the center. The fourth pass may modify the UV coordinates in order to line up the alpha mask with a camera image, such as a live camera feed image of a user's face. Lining up the alpha mask with the camera image may comprise lining up the white alpha mask with the facial feature or body part of interest.

The fourth pass of the multi-pass shader may additionally or alternatively include a fragment shader. The inset model 119 may be configured to extract a portion of at least one image based at least in part on the alpha mask. The portion may correspond to the at least one facial part. For example, the fragment shader may use the UV coordinates and alpha mask to perform an alpha cutout on the input texture to get a basic feathered inset result. The inset model 119 may be configured to create an effect on the extracted portion using the filter created in passes 2 and 3. For example, the fragment shader of the fourth pass may additionally or alternatively modulate the colors using blend modes, fill color, and/or outline color, which may utilize the alpha mask from the blur passes two and three.

In embodiments, the inset model 119 is configured to create a new image by merging the filtered extracted portion to a background image. The background image may be any image, such as one or more frames of a video created for distribution via the video service 116. The background image may be an image of the user, or an image that depicts something or somebody other than the user. After the new image or video has been created by merging the filtered extracted portion to a background image, the image or video may be uploaded to the cloud network 102 and/or the user may save the video locally to the client device 104a-n. The video service 116 may be configured to output the uploaded image or video to other users that are registered as users of the video service 116 via the content application 106.

Figure 2:
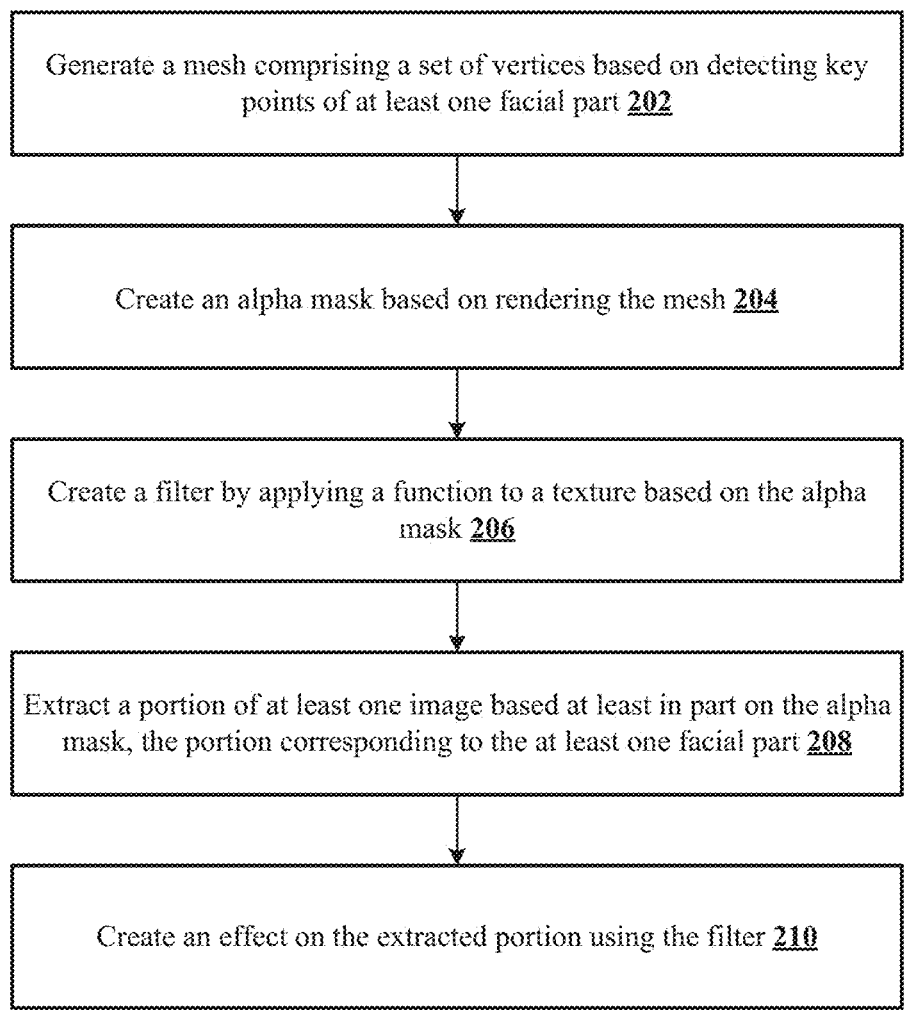
FIG. 2 shows an example process for creating effects based on face features in accordance with the present disclosure.

FIG. 2 illustrates an example process 200. The inset model 119 (client-side or server-side) may perform the process 200 to create effects. Although depicted as a sequence of operations in FIG. 2, those of ordinary skill in the art will appreciate that various embodiments may add, remove, reorder, or modify the depicted operations.

As described above, a mesh (e.g., base mesh) may be generated. At 202, a mesh comprising a set of vertices may be generated based on detecting key points of at least one facial part. The mesh includes a set of vertices based on detecting key points of at least one facial feature or body part (such as the facial feature or body part that is going to be mapped to a background image). For example, if the user wants to create an effect that maps the users mouth to a background image, the mesh includes a set of vertices based on detecting key points of the user's mouth. The mesh may be generated through script. Each vertex may have an index that corresponds to the index of a face algorithm key point. In some embodiments, the key points have to "wrap" in either a clockwise or counterclockwise fashion. However, the positions of the vertices may not need to be set yet, as long as the mesh is constructed correctly. For example, if the face algorithm output associated with a mouth has 9 key points, the mesh may have 9 vertices.

In embodiments, the extents of the key points from the face key point algorithm may be calculated. For example, one or more of the center, the left and/or right extents, and the top and/or down extents of the key points from the face key point algorithm may be calculated after generating the mesh. The material properties of the mesh may additionally or alternatively be set.

The mesh may be input into or sent to a multi-pass shader. First, the mesh may be input into the first pass of the multi-pass shader. The first pass of the multi-pass shader may comprise a vertex shader. The vertex shader may set the positions of the vertices in clip space to correspond to the screen space positions from the face algorithm key point positions. The vertex shader may additionally modify the vertex positions to account for the center, zoom, and/or rotation of the face inset object. For example, the vertex positions maybe modified using the left/right and up/down extents as well as the center.

The first pass of the multi-pass shader may comprise a fragment shader. The fragment shader may be configured to create an alpha mask based on the rendered mesh. At 204, an alpha mask may be created based on rendering the mesh. The fragment shader may create an alpha mask by rendering the mesh in white with a black background. For example, if the user wants to create an effect that maps the users mouth to a background image, the mesh includes a set of vertices based on detecting key points of the user's mouth. Creating the alpha mask may comprise rendering the area indicated by the set of vertices based on detecting key points of the user's mouth in white, with a black background surrounding the white area.

In embodiments, the second and/or third passes of the multi-pass shader are optional, such as if blur is enabled. The second and/or third passes of the multi-pass shader may be utilized to create a filter. At 206, a filter may be created by applying a function to a texture based on the alpha mask. For example, the second pass may include a vertex shader that utilizes a screen space quad. The second pass may additionally or alternatively include a fragment shader. The fragment shader may apply a horizontal Gaussian blur on the alpha texture result from the first pass. The third pass may include a vertex shader that positions the alpha mask in a screen space quad. The third pass may additionally or alternatively include a fragment shader. The fragment shader may apply a vertical Gaussian blur on the alpha texture result from the first or second pass.

The fourth pass of the multi-pass shader may comprise a vertex shader that uses a world space quad (e.g., a quad with position multiplied by camera MVP matrix). The fourth pass may modify the UV (e.g., texture) coordinates to account for the center, zoom, and rotation of the face inset object. For example, the fourth pass may modify the UV coordinates using the left/right and up/down extents as well as the center. The fourth pass may modify the UV coordinates in order to line up the alpha mask with a camera image, such as a live camera feed image of a user's face. Lining up the alpha mask with the camera image may comprise lining up the white alpha mask with the facial feature or body part of interest.

The fourth pass of the multi-pass shader may additionally or alternatively include a fragment shader. At 208, a portion of at least one image may be extracted based at least in part on the alpha mask. The portion may correspond to the at least one facial part. For example, the fragment shader may use the UV coordinates and alpha mask to perform an alpha cutout on the input texture to get a basic feathered inset result. At 210, an effect may be created on the extracted portion using the filter created in passes two and three. For example, the fragment shader of the fourth pass may additionally or alternatively modulate the colors using blend modes, fill color, and/or outline color, which may utilize the alpha mask from the blur passes two and three.

Figure 3:
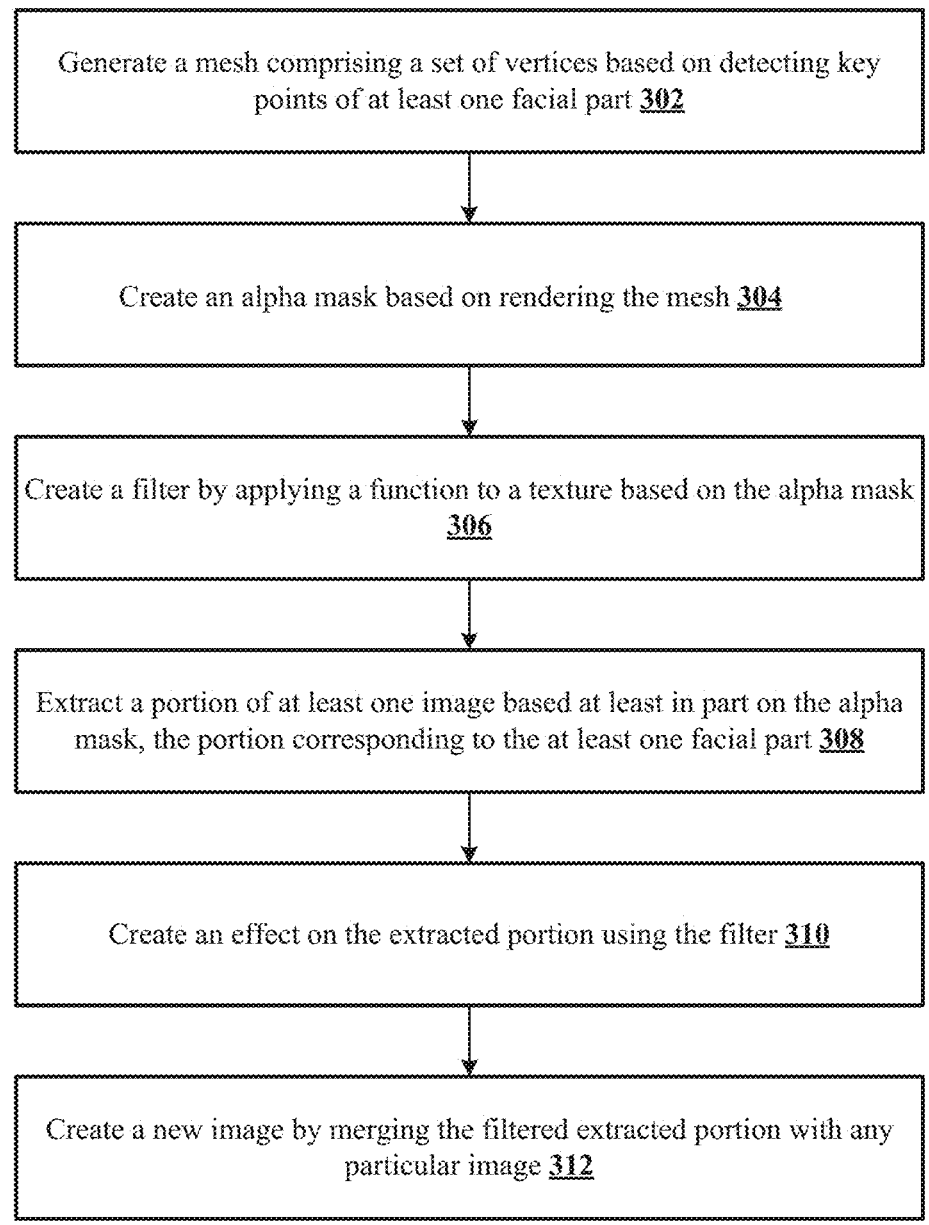
FIG. 3 shows another example process for creating effects based on face features in accordance with the present disclosure.

FIG. 3 illustrates an example process 300. The inset model 119 (client-side or server-side) may perform the process 300 to create an effect. Although depicted as a sequence of operations in FIG. 3, those of ordinary skill in the art will appreciate that various embodiments may add, remove, reorder, or modify the depicted operations.

As described above, a mesh (e.g., base mesh) may be generated. At 302, a mesh comprising a set of vertices may be generated based on detecting key points of at least one facial part. The mesh includes a set of vertices based on detecting key points of at least one facial feature or body part (such as the facial feature or body part that is going to be mapped to a background image). For example, if the user wants to create an effect that maps the users mouth to a background image, the mesh includes a set of vertices based on detecting key points of the user's mouth. The mesh may be generated through script. Each vertex may have an index that corresponds to the index of a face algorithm key point. In some embodiments, the key points have to "wrap" in either a clockwise or counterclockwise fashion. However, the positions of the vertices may not need to be set yet, as long as the mesh is constructed correctly. For example, if the face algorithm output associated with a mouth has 9 key points, the mesh may have 9 vertices.

In embodiments, the extents of the key points from the face key point algorithm may be calculated. For example, one or more of the center, the left and/or right extents, and the top and/or down extents of the key points from the face key point algorithm may be calculated after generating the mesh. The material properties of the mesh may additionally or alternatively be set. Such material properties may be utilized for use in passes one and four of the multi-pass shader. Optionally, the multi-pass shader includes passes two and three. Passes two and three may be included if blurring is enabled. If blurring is enabled, blur parameters may be calculated the material properties for use in passes two and three may be set.

The mesh may be input into or sent to a multi-pass shader. First, the mesh may be input into the first pass of the multi-pass shader. The first pass of the multi-pass shader may comprise a vertex shader. The vertex shader may set the positions of the vertices in clip space to correspond to the screen space positions from the face algorithm key point positions. The vertex shader may additionally modify the vertex positions to account for the center, zoom, and/or rotation of the face inset object. For example, the vertex positions maybe modified using the left/right and up/down extents as well as the center.

The first pass of the multi-pass shader may comprise a fragment shader. The fragment shader may be configured to create an alpha mask based on the rendered mesh. At 304, an alpha mask may be created based on rendering the mesh. The fragment shader may create an alpha mask by rendering the mesh in white with a black background. For example, if the user wants to create an effect that maps the users mouth to a background image, the mesh includes a set of vertices based on detecting key points of the user's mouth. Creating the alpha mask may comprise rendering the area indicated by the set of vertices based on detecting key points of the user's mouth in white, with a black background surrounding the white area.

In embodiments, the second and/or third passes of the multi-pass shader are optional, such as if blur is enabled. The second and/or third passes of the multi-pass shader may be utilized to create a filter. At 306, a filter may be created by applying a function to a texture based on the alpha mask. For example, the second pass may include a vertex shader that positions the alpha mask in a screen space quad. The second pass may additionally or alternatively include a fragment shader. The fragment shader may apply a horizontal Gaussian blur on the alpha texture result from the first pass. The third pass may include a vertex shader that positions the alpha mask in a screen space quad. The third pass may additionally or alternatively include a fragment shader. The fragment shader may apply a vertical Gaussian blur on the alpha texture result from the first or second pass.

The fourth pass of the multi-pass shader may comprise a vertex shader that uses a world space quad (e.g., a quad with position multiplied by camera MVP matrix). The fourth pass may modify the UV (e.g., texture) coordinates to account for the center, zoom, and rotation of the face inset object. For example, the fourth pass may modify the UV coordinates using the left/right and up/down extents as well as the center. The fourth pass may modify the UV coordinates in order to line up the alpha mask with a camera image, such as a live camera feed image of a user's face. Lining up the alpha mask with the camera image may comprise lining up the white alpha mask with the facial feature or body part of interest.

The fourth pass of the multi-pass shader may additionally or alternatively include a fragment shader. At 308, a portion of at least one image may be extracted based at least in part on the alpha mask. The portion may correspond to the at least one facial part. For example, the fragment shader may use the UV coordinates and alpha mask to perform an alpha cutout on the input texture to get a basic feathered inset result. At 310, an effect may be created on the extracted portion using the filter created in passes two and three. For example, the fragment shader of the fourth pass may additionally or alternatively modulate the colors using blend modes, fill color, and/or outline color (which may utilize the alpha mask from the blur passes two and three).

A new image may be created by merging the filtered extracted portion to a background image. At 312, a new image may be created by merging the filtered extracted portion to any particular image. The background image may be any image, such as one or more frames of a video created for distribution via the video service 116. The background image may be an image of the user, or an image that depicts something or somebody other than the user. After the new image or video has been created by merging the filtered extracted portion to a background image, the image or video may be uploaded to the cloud network 102 and/or the user may save the video locally to the client device 104*a-n*. The video service 116 may be configured to output the uploaded image or video to other users that are registered as users of the video service 116 via the content application 106.

Figure 4:
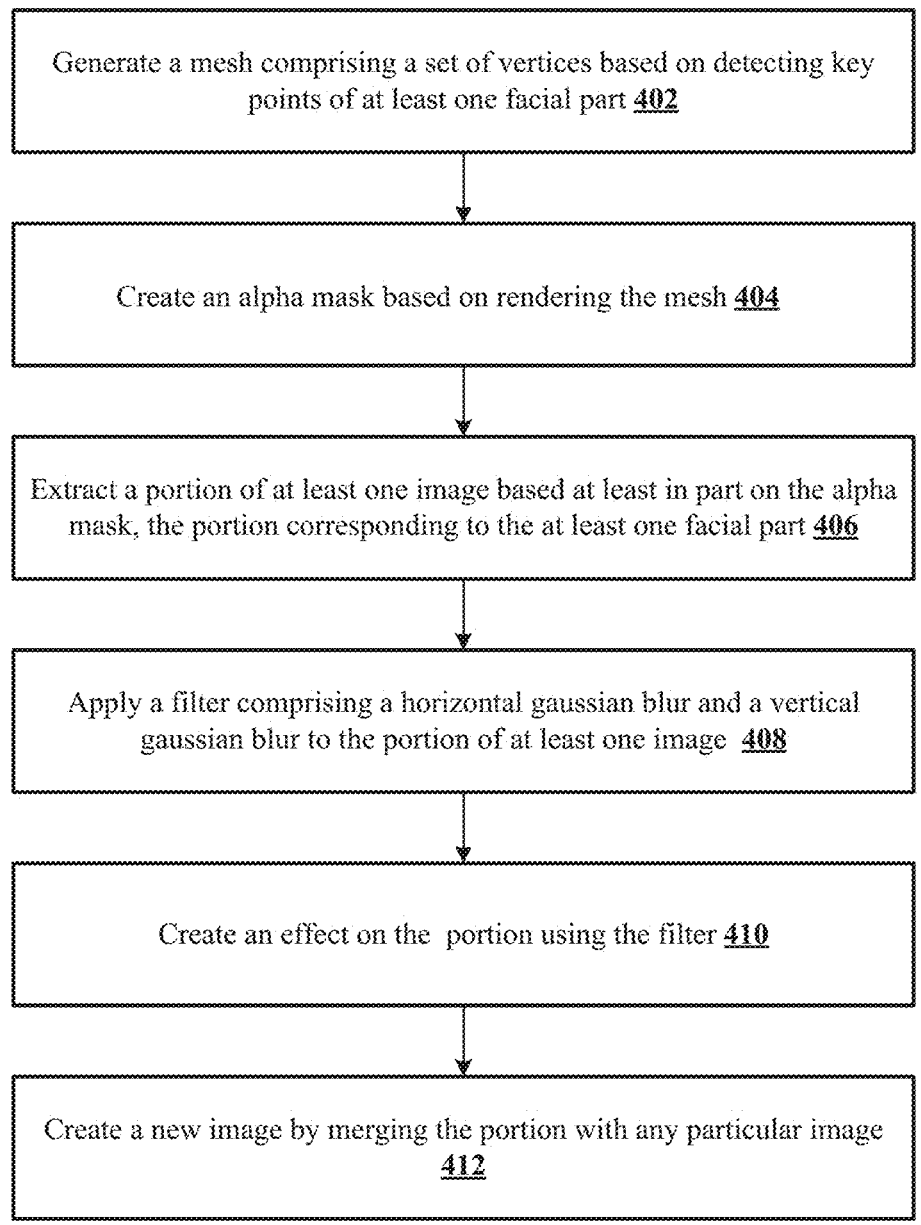
FIG. 4 shows another example process for creating effects based on face features in accordance with the present disclosure.

FIG. 4 illustrates an example process 400. The inset model 119 (client-side or server-side) may perform the process 400 to create effects. Although depicted as a sequence of operations in FIG. 4, those of ordinary skill in the art will appreciate that various embodiments may add, remove, reorder, or modify the depicted operations.

As described above, a mesh (e.g., base mesh) may be generated. At 402, a mesh comprising a set of vertices may be generated based on detecting key points of at least one facial part. The mesh includes a set of vertices based on detecting key points of at least one facial feature or body part (such as the facial feature or body part that is going to be mapped to a background image). For example, if the user wants to create an effect that maps the users mouth to a background image, the mesh includes a set of vertices based on detecting key points of the user's mouth. The mesh may be generated through script. Each vertex may have an index that corresponds to the index of a face algorithm key point. In some embodiments, the key points have to "wrap" in either a clockwise or counterclockwise fashion. However, the positions of the vertices may not need to be set yet, as long as the mesh is constructed correctly. For example, if the face algorithm output associated with a mouth has 9 key points, the mesh may have 9 vertices.

In embodiments, the extents of the key points from the face key point algorithm may be calculated. For example, one or more of the center, the left and/or right extents, and the top and/or down extents of the key points from the face key point algorithm may be calculated after generating the mesh. The material properties of the mesh may additionally or alternatively be set. Such material properties may be utilized for use in passes one and four of the multi-pass shader. Optionally, the multi-pass shader includes passes two and three. Passes two and three may be included if blurring is enabled. If blurring is enabled, blur parameters may be calculated the material properties for use in passes two and three may be set.

The mesh may be input into or sent to a multi-pass shader. First, the mesh may be input into the first pass of the multi-pass shader. The first pass of the multi-pass shader may comprise a vertex shader. The vertex shader may set the positions of the vertices in clip space to correspond to the screen space positions from the face algorithm key point positions. The vertex shader may additionally modify the vertex positions to account for the center, zoom, and/or rotation of the face inset object. For example, the vertex positions maybe modified using the left/right and up/down extents as well as the center.

The first pass of the multi-pass shader may comprise a fragment shader. The fragment shader may be configured to create an alpha mask based on the rendered mesh. At 404, an alpha mask may be created based on rendering the mesh. The fragment shader may create an alpha mask by rendering the mesh in white with a black background. For example, if the user wants to create an effect that maps the users mouth to a background image, the mesh includes a set of vertices based on detecting key points of the user's mouth. Creating the alpha mask may comprise rendering the area indicated by the set of vertices based on detecting key points of the user's mouth in white, with a black background surrounding the white area.

The fourth pass of the multi-pass shader may additionally or alternatively include a fragment shader. At 406, a portion of at least one image may be extracted based at least in part on the alpha mask. The portion may correspond to the at least one facial part. For example, the fragment shader may use the UV coordinates and alpha mask to perform an alpha cutout on the input texture to get a basic feathered inset result. As described above, a filter may have already been created during the second and/or third passes of the multi-pass shader. At 408, the filter comprising a horizontal gaussian blur and a vertical gaussian blur may be applied to the extracted portion of the at least one image. At 410, an effect may be created on the extracted portion using the filter. For example, the fragment shader of the fourth pass may additionally or alternatively modulate the colors using blend modes, fill color, and/or outline color, which may utilize the alpha mask from the blur passes two and three.

A new image may be created by merging the filtered extracted portion to a background image. At 412, a new image may be created by merging the filtered extracted portion with any particular image. The background image may be any image, such as one or more frames of a video created for distribution via the video service 116. The background image may be an image of the user, or an image that depicts something or somebody other than the user. After the new image or video has been created by merging the filtered extracted portion to a background image, the image or video may be uploaded to the cloud network 102 and/or the user may save the video locally to the client device 104*a-n*. The video service 116 may be configured to output the uploaded image or video to other users that are registered as users of the video service 116 via the content application 106.

Figure 5:
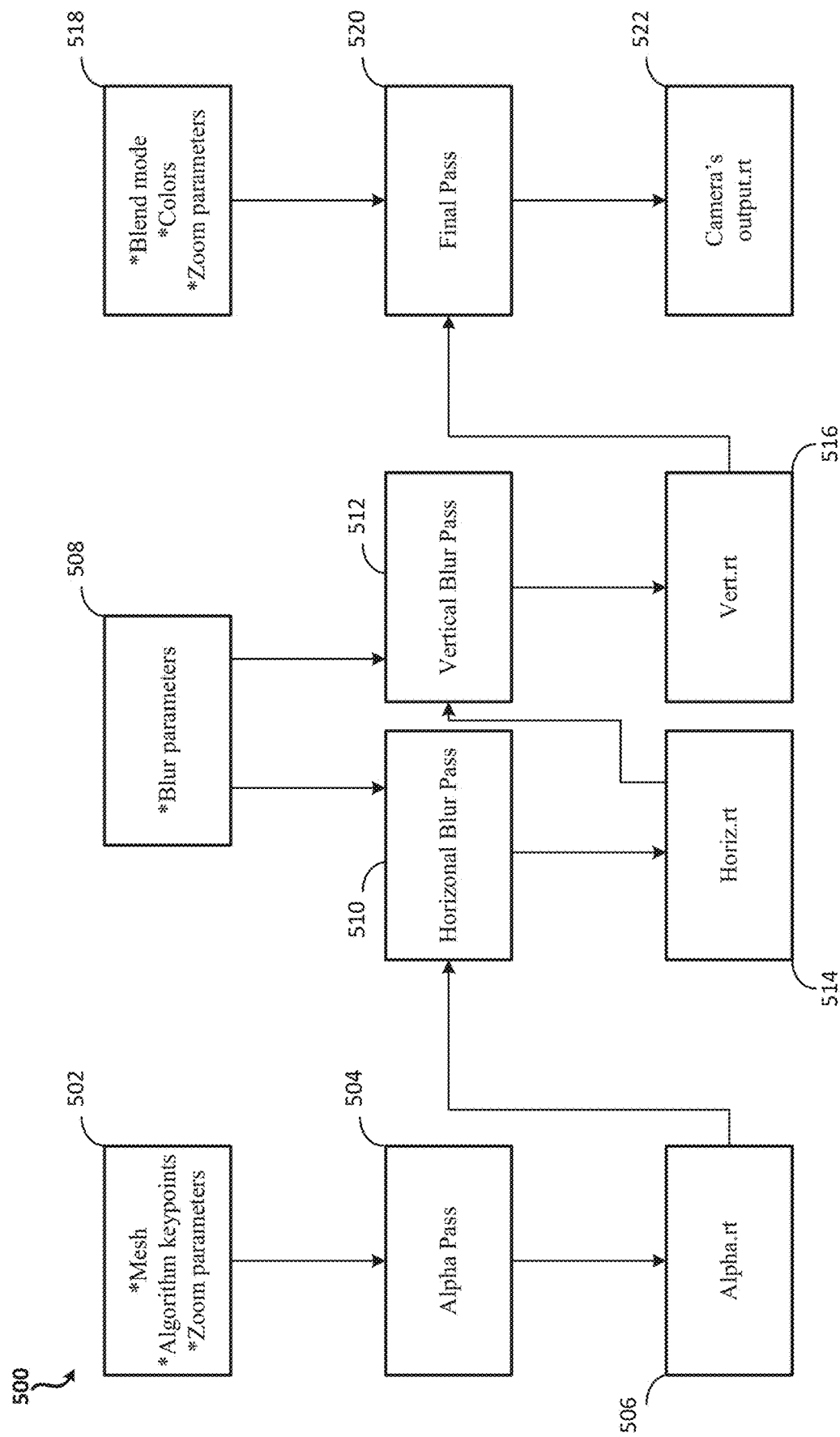
FIG. 5 shows an example flowchart for creating effects in accordance with the present disclosure.
Figure 6:
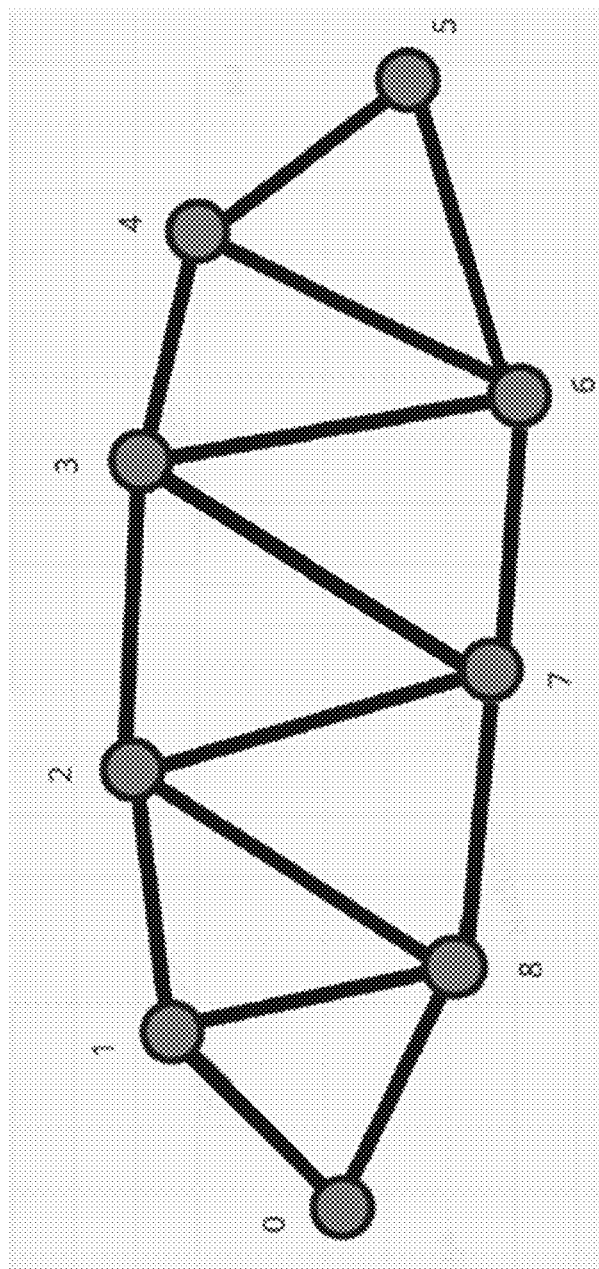
FIG. 6 shows an example base mesh in accordance with the present disclosure.

FIG. 5 is flow chart that shows an example flowchart for creating effects using AR face insets. As described above, a mesh (e.g., base mesh) may be generated. The base mesh comprises set of vertices may be generated based on detecting key points of at least one facial part or body part (such as the facial feature or body part that is going to be mapped to a background image). FIG. 6 shows an example base mesh 600. The base mesh 600 shows nine vertices, labeled 1-9. Each of the nine vertices corresponds to a key point of at least one facial part or body part, such as a mouth or an eye. The mesh 600 may be generated through script. Each vertex has an index (1-9) that corresponds to the index of a face algorithm key point. In some embodiments, the key points have to "wrap" in either a clockwise or counterclockwise fashion. However, the positions of the vertices may not need to be set yet.

In embodiments, the extents of the key points from the face key point algorithm may be calculated. For example, one or more of the center, the left and/or right extents, and the top and/or down extents of the key points from the face key point algorithm may be calculated after generating the mesh 600. The material properties of the mesh 600 may additionally or alternatively be set. Such material properties may be utilized for use in passes one and four of the multi-pass shader. Optionally, the multi-pass shader includes passes two and three. Passes two and three may be included if blurring is enabled. If blurring is enabled, blur parameters may be calculated the material properties for use in passes two and three may be set.

The mesh 600 may be input into or sent to a multi-pass shader. Referring back to FIG. 5, the mesh, the algorithm key points and/or the zoom parameters 502 may be input into the first pass 504 (e.g., alpha pass) of the multi-pass shader. The first pass 504 of the multi-pass shader may comprise a vertex shader. The vertex shader may set the positions of the vertices in clip space to correspond to the screen space positions from the face algorithm key point positions. The vertex shader may additionally modify the vertex positions to account for the center, zoom, and/or rotation of the face inset object. For example, the vertex positions maybe modified using the left/right and up/down extents as well as the center.

The first pass 504 of the multi-pass shader may comprise a fragment shader. The fragment shader may be configured to create an alpha mask 506 based on the rendered mesh. The fragment shader may create an alpha mask 506 by rendering the mesh in white with a black background. For example, if the user wants to create an effect that maps the users mouth to a background image, the mesh includes a set of vertices based on detecting key points of the user's mouth. Creating the alpha mask 506 may comprise rendering the area indicated by the set of vertices based on detecting key points of the user's mouth in white, with a black background surrounding the white area.

In embodiments, the second pass 510 (e.g., horizontal blur pass) and/or the third pass 512 (e.g., vertical blur pass) of the multi-pass shader are optional, such as if blur is enabled. Blur parameters 508 may be input into the second pass 510 and the third pass 512. The second pass 510 and/or the third pass 512 of the multi-pass shader may be utilized to create a filter. For example, the second pass 510 may include a vertex shader that positions the alpha mask 506 in a screen space quad. The second pass may additionally or alternatively include a fragment shader. The fragment shader may apply a horizontal Gaussian blur on the alpha mask 506 to create a modified alpha mask 514. The third pass 512 may include a vertex shader that positions the modified alpha mask 514 in a screen space quad. The third pass 512 may additionally or alternatively include a fragment shader. The fragment shader may apply a vertical Gaussian blur on modified alpha mask 514 to create a new modified alpha mask 516.

Referring back to FIG. 5, the new modified alpha mask 516 may be fed into the fourth pass 520 (e.g., final pass) of the multi-pass shader along with blend mode, colors, and/or zoom parameters 518. The fourth pass 520 may comprise a vertex shader that uses a world space quad (e.g., a quad with position multiplied by camera MVP matrix). The fourth pass 520 may modify the UV (e.g., texture) coordinates to account for the center, zoom, and rotation of the face inset object. For example, the fourth pass 520 may modify the UV coordinates using the left/right and up/down extents as well as the center. The fourth pass 520 may modify the UV coordinates in order to line up the modified alpha mask 516 with a camera image, such as a live camera feed image of a user's face. Lining up the modified alpha mask 516 with the camera image may comprise lining up the white part of the alpha mask with the facial feature or body part of interest.

The fourth pass 520 may additionally or alternatively include a fragment shader. The fragment shader may extract a portion of at least one image based at least in part on the modified alpha mask 516. The portion may correspond to the at least one facial part. For example, the fragment shader may use the UV coordinates and modified alpha mask 516 to perform an alpha cutout on the input texture to get a basic feathered inset result. The inset model 119 may be configured to create an effect on the extracted portion using the filter created in passes 2 and 3. For example, the fragment shader of the fourth pass may additionally or alternatively modulate the colors using blend modes, fill color, and/or outline color (which may utilize the alpha mask from the blur passes two and three).

Figure 7:
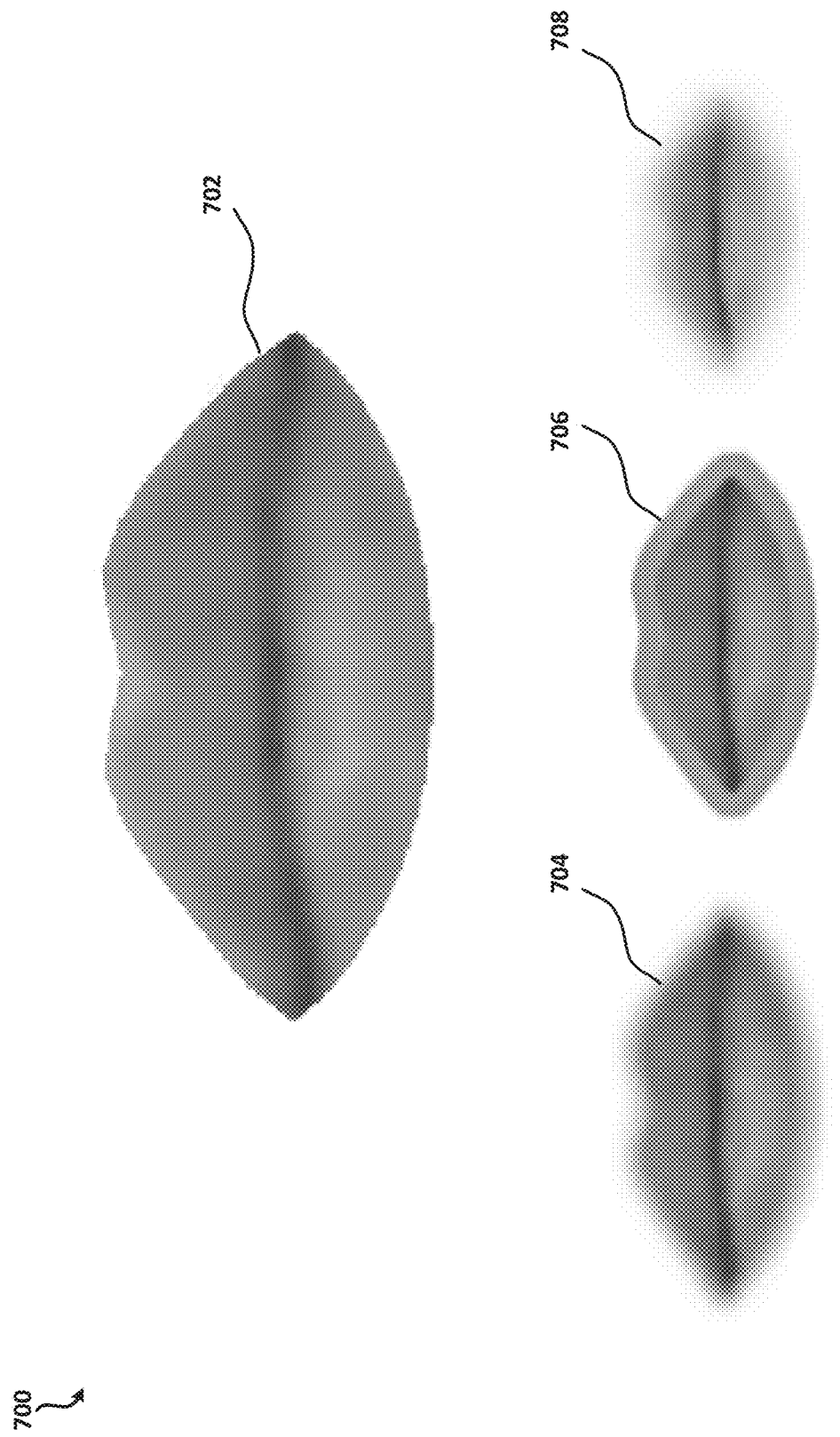
FIG. 7 shows portions of example effects created in accordance with the present disclosure.

FIG. 7 shows portions of example effects created using the multi-pass shader in accordance with the present disclosure. The feature 702 is an example of the results, without any feathering or blurring. The feature 704 is an example of the results with some feathering or blurring. The feature 706 is an example of the results with an outline around the feature. The feature 706 is an example of the results with more feathering or blurring than the feature 704. The features 704 and 706, despite having feathering, do not have line-like artifacts in the feathering like previous face inset techniques.

A new image may be created by merging the filtered extracted portion to a background image. The new image 522 (e.g., camera output) may be created by merging the filtered extracted portion to any particular image. The background image may be any image, such as one or more frames of a video created for distribution via the video service 116. The background image may be an image of the user, or an image that depicts something or somebody other than the user.

After the new image or video has been created by merging the filtered extracted portion to a background image, the image or video may be uploaded to the cloud network 102 and/or the user may save the video locally to the client device 104a-n. The video service 116 may be configured to output the uploaded image or video to other users that are registered as users of the video service 116 via the content application 106.

Figure 8:
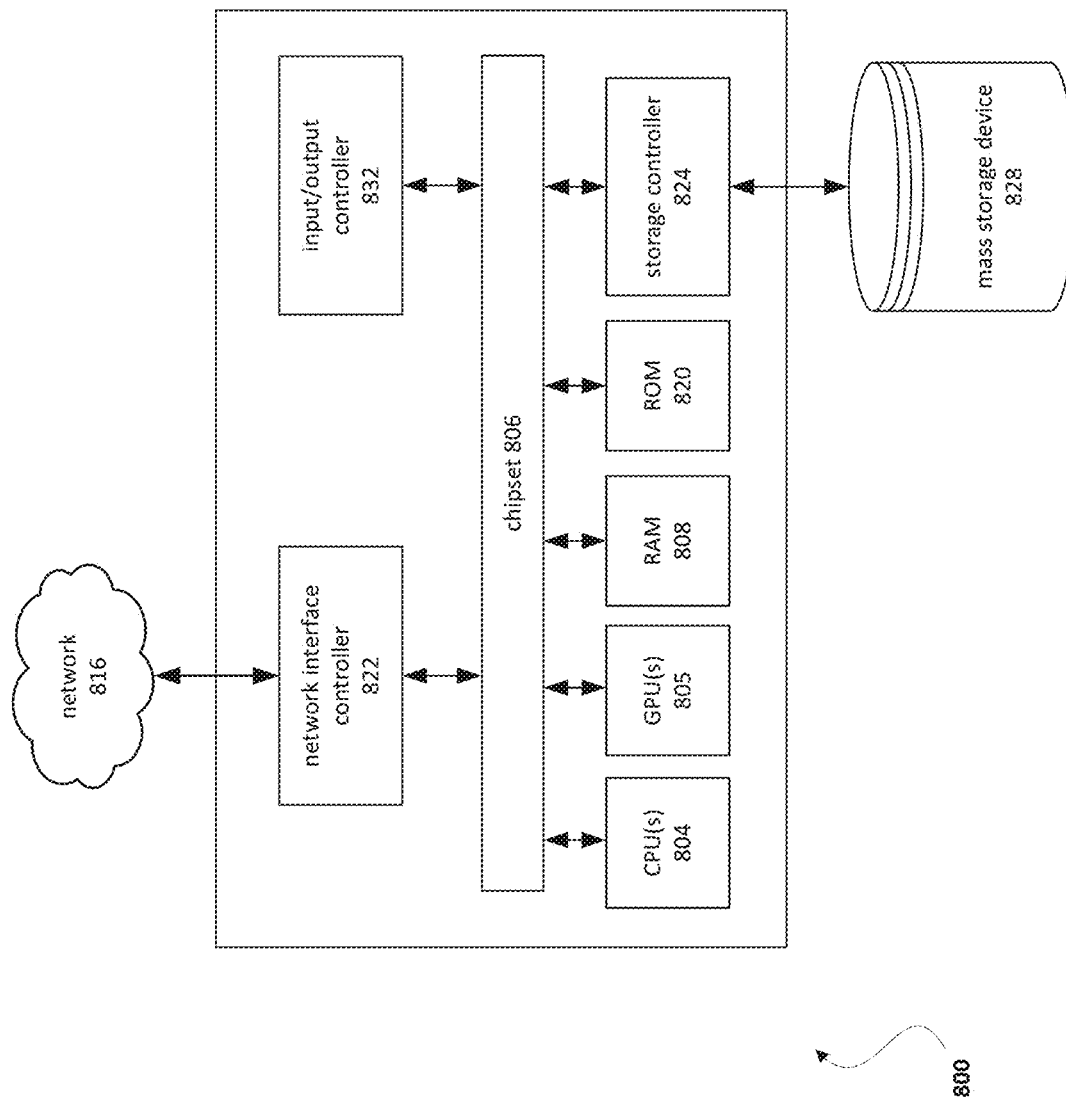
FIG. 8 shows an example computing device which may be used to perform any of the techniques disclosed herein.

FIG. 8 illustrates a computing device that may be used in various aspects, such as the services, networks, modules, and/or devices depicted in FIG. 1. With regard to the example architecture of FIG. 1, the cloud network (and any of its components), the client devices, and/or the network may each be implemented by one or more instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s). The GPU(s) may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random-access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN). The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. The mass storage device 828 may comprise a management component 88. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on the mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described herein.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
   generating a mesh comprising a set of vertices based on detecting key points of at least one facial part, wherein the at least one facial part is to be mapped to images depicting other things than the at least one facial part;
   creating a mask based on rendering the mesh by inputting the mesh into a first pass of a multi-pass shader;
   creating, by at least one of a second pass or a third pass of the multi-pass shader, a filter by applying a function to a texture based on the mask, wherein the at least one of the second pass or the third pass is configured to apply the function to the texture output from the first pass or the second pass;
   performing an alpha cutout on an input texture by a fourth pass of the multi-pass shader, a result of the alpha cutout corresponding to the at least one facial part; and
   creating an effect based on an extracted portion resulted from the alpha cutout, wherein the effect enables to map the at least one facial part to the images depicting other things than the at least one facial part.

2. The method of claim 1, wherein the creating a mask based on rendering the mesh comprises creating an alpha mask based on rendering the mesh in white with a black background.

3. The method of claim 1, wherein the filter comprises a horizontal gaussian blur and a vertical gaussian blur.

4. The method of claim 3, further comprising:
   applying the horizontal gaussian blur and the vertical gaussian blur to the portion of the at least one image.

5. The method of claim 1, wherein the creating an effect further comprises modulating, filling, or outlining a color on the extracted portion.

6. The method of claim 1, further comprising:
   creating a new image by merging the filtered extracted portion with any particular image.

7. The method of claim 1, wherein the at least one image is at least one of a plurality of video frames.

8. A system, comprising:
   at least one processor; and
   at least one memory comprising computer-readable instructions that upon execution by the at least one processor cause the computing device to perform operations comprising:
   generating a mesh comprising a set of vertices based on detecting key points of at least one facial part, wherein the at least one facial part is to be mapped to images depicting other things than the at least one facial part;
   creating a mask based on rendering the mesh by inputting the mesh into a first pass of a multi-pass shader;
   creating, by at least one of a second pass or a third pass of the multi-pass shader, a filter by applying a function to a texture based on the mask, wherein the at least one of the second pass or the third pass is configured to apply the function to the texture output from the first pass or the second pass;
   performing an alpha cutout on an input texture by a fourth pass of the multi-pass shader, a result of the alpha cutout the portion corresponding to the at least one facial part; and
   creating an effect based on an extracted portion resulted from the alpha cutout, wherein the effect enables to map the at least one facial part to the images depicting other things than the at least one facial part.

9. The system of claim 8, wherein the creating a mask based on rendering the mesh comprises creating an alpha mask based on rendering the mesh in white with a black background.

10. The system of claim 8, wherein the filter comprises a horizontal gaussian blur and a vertical gaussian blur, and wherein the operations further comprise:

applying the horizontal gaussian blur and the vertical gaussian blur to the portion of the at least one image.

11. The system of claim 8, wherein the creating an effect further comprises modulating, filling, or outlining a color on the extracted portion.

12. The system of claim 8, the operations further comprising:
creating a new image by merging the filtered extracted portion with any particular image.

13. A non-transitory computer-readable storage medium, storing computer-readable instructions that upon execution by a processor cause the processor to implement operations, the operation comprising:
generating a mesh comprising a set of vertices based on detecting key points of at least one facial part, wherein the at least one facial part is to be mapped to images depicting other things than the at least one facial part;
creating a mask based on rendering the mesh by inputting the mesh into a first pass of a multi-pass shader;
creating, by at least one of a second pass or a third pass of the multi-pass shader, a filter by applying a function to a texture based on the mask, wherein the at least one of the second pass or the third pass is configured to apply the function to the texture output from the first pass or the second pass;
performing an alpha cutout on an input texture by a fourth pass of the multi-pass shader, a result of the alpha cutout corresponding to the at least one facial part; and
creating an effect based on an extracted portion resulted from the alpha cutout, wherein the effect enables to map the at least one facial part to the images depicting other things than the at least one facial part.

14. The non-transitory computer-readable storage medium of claim 13, wherein the creating a mask based on rendering the mesh comprises creating an alpha mask based on rendering the mesh in white with a black background.

15. The non-transitory computer-readable storage medium of claim 13, wherein the filter comprises a horizontal gaussian blur and a vertical gaussian blur, and wherein the operations further comprise:
applying the horizontal gaussian blur and the vertical gaussian blur to the portion of the at least one image.

16. The non-transitory computer-readable storage medium of claim 13, wherein the creating an effect further comprises modulating, filling, or outlining a color on the extracted portion.

17. The non-transitory computer-readable storage medium of claim 13, the operations further comprising:
creating a new image by merging the filtered extracted portion with any particular image.

* * * * *